US005481805A

United States Patent [19]

Wilson

[11] Patent Number: 5,481,805

[45] Date of Patent: Jan. 9, 1996

[54] EATING UTENSIL

[76] Inventor: Mark P. Wilson, 1773 Harmony La., Sarasota, Fla. 34239

[21] Appl. No.: 167,988

[22] PCT Filed: Jun. 27, 1992

[86] PCT No.: PCT/IT92/00070

§ 371 Date: May 19, 1994

§ 102(e) Date: May 19, 1994

[87] PCT Pub. No.: WO93/00032

PCT Pub. Date: Jan. 7, 1993

[30] Foreign Application Priority Data

Jun. 28, 1991 [IT] Italy .................................... FI91A162

[51] Int. Cl.$^6$ .................................................. A47J 43/28

[52] U.S. Cl. .................................................. 30/322; D7/653

[58] Field of Search ........................ 30/322–328; D7/642, D7/649, 653

[56] References Cited

U.S. PATENT DOCUMENTS

D. 226,139 9/1982 Cyren ........................................ D7/653

D. 271,364 11/1983 Cassini ...................................... D7/653

D. 271,366 11/1983 Cassini ...................................... D7/653

4,035,865 7/1977 McRae et al. ............................ 16/114

4,917,517 4/1990 Ertz ............................................ 401/6

FOREIGN PATENT DOCUMENTS 2038648 4/1981 United Kingdom .

*Primary Examiner*—Douglas D. Watts

*Attorney, Agent, or Firm*—Dowell & Dowell

[57] ABSTRACT

An eating utensil suitable for use by individuals having hand impairments includes a head portion which may be a fork, spoon or knife, and a handle portion. The handle portion has an arcuate, flared configuration which is anatomically designed to correspond to the natural shape of an individual's hand such that it can be grasped in different hand positions depending on the head portion used and the nature of the individual's hand impairment.

20 Claims, 3 Drawing Sheets

EATING UTENSIL

BACKGROUND OF THE INVENTION

This invention relates to an eating utensil for use by those with handicaps affecting the hands.

The experts in this field are extremely aware of the problems faced by individuals with hand impairments, whether of a congenital or of an acquired nature, when trying to eat.

To better understand the problems encountered in the use of a utensil in bringing food to the mouth, it is helpful to first of all briefly describe the morphology of the hand, its movements and dysfunctions.

The hand, as described in FIG. 2, has an anterior side, or palm 1, a posterior side, or dorsal 2, a medial edge 3, a lateral edge 4, and lastly a distal edge 5, from which the fingers originate; the palm is concave in the center and has slightly protruding margins. The most outstanding protrusion is found at the base of the thumb 10, said protrusion is determined by the fleshy mass of three muscles and has an elongated freshy protuberance 6, with the larger pole towards the wrist; on the opposite side is another, less outstanding protrusion 7, of an elongated elliptical shape, which corresponds to the little finger 14. These two protrusions, in proximity of the wrist, are found close together and separated by only a gentle depression 8. The palm of the hand has four folds disposed in an M form, and are: the thumb fold *9a*, the fold of the fingers *9b*, the longitudinal fold *9c*, and the oblique fold *9d*.

The dorsal side of the hand reflects, on the whole, the form of the skeleton, slightly convex in the transversal sense; the spaces between the metacarpal bones are filled by the dorsal interosseous muscles, and above the lower level run the tendons of the extensor muscles of the fingers. Regarding the length of the fingers, the thumb 10 is the shortest consisting of only two phalanges, the middle finger 12 is the longest, while the index finger 11 and the ring finger 13 are generally equivalent and the tip of these two fingers arrive at the midway point of the terminal segment of the middle finger 12, the little finger 14 terminates at the point of the second interphalangic articulation of the ring finger 13.

Regarding the movements of the fingers, it is important to clarify in precise terms, that the bending of the first segment of the finger can reach a right angle with respect to the plane of the hand; while the second segment can slightly exceed a right angle, and the terminal segment generally cannot reach a right angle bend.

SUMMARY OF THE INVENTION

Laterality movements of the fingers—the bringing together towards and separating of the fingers from one another—occur as a result of metacarpal-phalangic articulation.

The thumb has various and extended movements, owed to the articulation of the corresponding metacarpal bone with the carpus (trapezial), and the most important movement being the one towards and away from the other fingers.

Various pathologies concern the functional limitations of the hand: for example, deformative arthritis, other forms of arthritis and polyarthritis, contractures of the fingers, as well as the various forms of paralysis.

All the various forms of pathologies, congenital or acquired, the paresis, as well as the neurolesisons, create difficulty in the movement of the fingers' articulations, and most of all bring about a limited capacity of fine prehension in addition the impossibility of holding an object through the combined action of the fingers with the concave part of the hand.

The known utensils which enable patients to feed themselves all belong to one of the following groups:

one ties the traditional utensils (fork or knife for example), to a dorsal support fixed to the wrists and to the dorsal portion of the hand, that allows the its use solely as a support for the utensil, while having to depend upon the rotary movements of the arm, discounting the functionality of the hand;

the other is based upon the use of utensils which employ one or more fingers as hooks, requiring that the user be able to exert a considerable amount of gripping force. In any event, the various inconveniences that present themselves are quite evident: utensils which depend upon the rotary action of the hand, make possible only a part of the functions necessary to successfully use the utensil, for example they don't allow the cutting action, because executing this action requires the involvement of the medial zone of the hand, through which the force of applied pressure is transmitted.

Another inconvenience found in those utensils which rely upon a hoking grasp, therefore requiring at least the use of two contiguous fingers and a good amount of flexibility in the grasp, which the limitations brought about by the particular pathology might allow the muscles of the arm, the dorsal interosseous muscles as well as the estensor muscles of the fingers.

A further inconvenience found in all utensils of the prior art for the above described use, is due to the requirement that the user have a hand capable of executing the principal lateral movements, which consist of the possibility of bringing together the fingers and moving them apart; this is not always possible because some pathologies do not allow articulation of the metacarpal and of the phalanges. It is therefore an aim of this invention to provide an eating utensil for patients with hand impairments which doesn't require for its use articulatory movements of all the fingers together, and which allows a regaining of a useful minimal grasping motion.

It is a further aim of this invention to develop a utensil which has the possibility of being put in the concave part of the median area of the palm of the hand, but which employs for its holding and directionality, the lateral edges and three flexor muscles of the thumb.

Additional aims of this invention are to provide a utensil of great simplicity in its construction, in order to make possible the industralised production at low cost while satisfying the needs of the user.

These aims are achieved, according to the invention, by an eating utensil consisting of a functional head portion—for example: spoon, fork or knife—and a handle for the palmar grip, comprising:

a functional head portion having a concave bowl shape, when functioning as a spoon, tines when functioning as a fork, and a blade when functioning as a knife;

a neck joinder portion which constitutes the part which connects the tool which engages the food, to the handle for the holding thereof.

a gripping handle having flared wings, which adheres to the palm of the hand's medial edges, which reaches the lateral edges and tapers towards the distal edge for the placement of the index finger and further towards the rear for the placement of the middle and ring fingers; the gripping of the utensil occurs either by using the three protruding ovoidal-shaped muscles of the thumb finger, which hold the device together with the little finger; or by using the fingers as hooks without employing the palm or the thumb;

a terminal portion of the utensil, which favors directionality and balancing through a tail portion upon which the light depression of the anterior side of the rear portion of the hand rests. This depressed area of the hand is found between the protruding ovoidal mass at the base of the thumb and the protruding portion having an elongated form which corresponds with the little finger.

For a better understanding of the present invention, the following disclosure describes the preferred embodiment presented solely as an example without intending to limit the invention to said embodiment or use, with reference to the attached drawings, in which.

Figure 1:
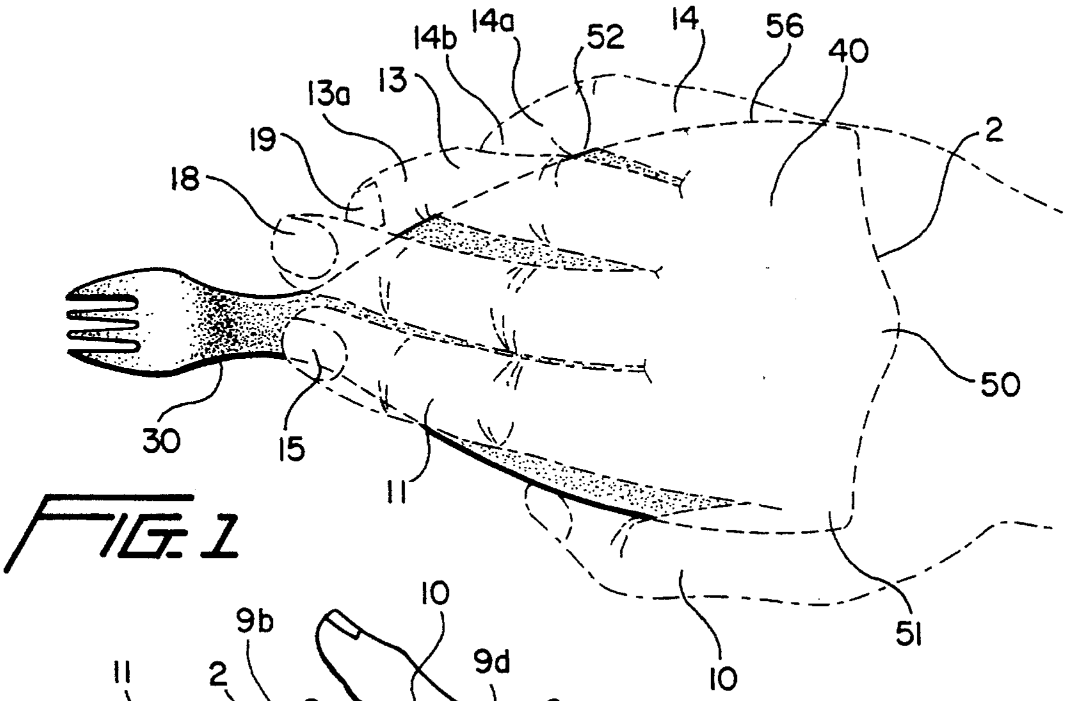
FIG. 1, is a top plan view as of the utensil it is being held.
Figure 2:
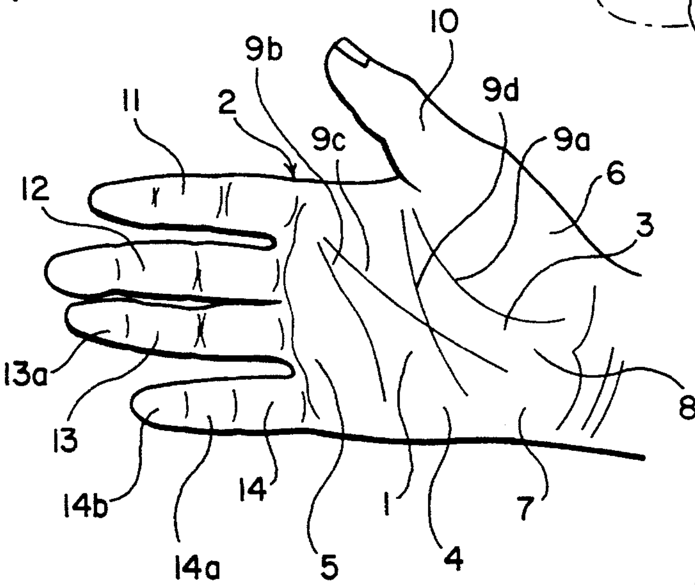
FIG. 2, is a view of the anterior face of palm of the hand.

As illustrated in FIGS. 1 and 4–10, a utensil, in accordance with the invention, is made of one piece of metallic, plastic, or natural material, and is suitable for being stamped, formed, cast, or hand made. Whatever the material, it must guarantee homogeneity and lightness in the three parts which compose it: the head 20, neck joinder portion 30, and handle 40.

The head portion 20, in order to form an eating utensil for individuals with hand impairments, can consist of a fork 22, a spoon 24, or a knife 26.

In accordance with what is illustrated in FIGS. 1, 4, 5, 6, the fork 22, which has a number of tines to engage the food, is connected to the handle portion 40, through a neck joinder part which has a profile 33 section formed by a reflex S-curve composed of two arcs, 32 and 34.

It is in the upper concave part of the terminal portion 32, at the point where the neck joinder portion 30 is connected to the handle portion 40, that the index finger 11 concentrates through its tip the directional forces coming from the entire hand which has grasped the utensil. The index finger 11, in the correct position, follows a reflex curve, given by the S-shaped neck joinder portion 30, with the concave part 32, containing its ending portion 15; it then follows the saddle-like shape 16, to then lie on an area 17, in proximity of the longitudinal fold 9*c* of the palm of the hand, while the middle finger 12, and the ring finger 13, simply rest on the utensil following the curve 32, 35, 36, not cooperating and not needing to exert gripping, balancing or directionality functions.

The forward most parts 18 and 19, corresponding to the last phalanges of the fingers 12 and 13, are not obligated to stay in an extended position, but may bend to the point of reaching a right angle with respect to the palm 1, of the hand. Individuals who, due to circulatory problems need to move the hand, may freely and physiologically move fingers 12 and 13, beginning with the distal edge 5, favoring the entire function of the hand.

The handle 40, with a saddle shaped longitudinal shape, which follows the curve that goes from 32 to 35 and 36, reflects the concavity of the skeleton of the hand, which is considered to be in the relaxed position when the muscles and flexor tendons are in a state of abandon.

As in FIGS. 4, 5, 7, and 9, the handle 40 has a symmetrical flared wing shape 45 and 46, that tapers towards the neck joinder portion 30, with a curvilinear shape from 48 to 44; the flared wing shape assures that the handle follows the shape of the palm 1 of the hand, taking into consideration the anterior side, the medial edge 3, up to the lateral edge 4, which closes down on the distal edge 5, considering that it is near the point at which the fingers originate; the outline of the handle is tapered in areas 42 and 43 approximately, so that 47 to 36 form the area upon which the index finger 11 may rest.

Figure 7:
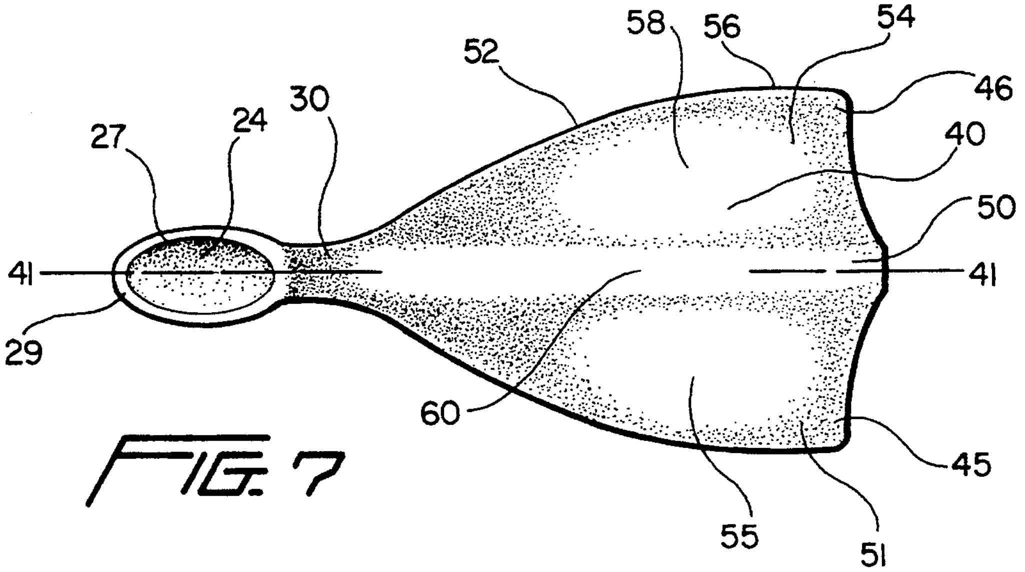
FIG. 7, is a top plan view of the utensil as a spoon.

As represented in FIGS. 1 and 7, the preferred grip takes place starting form the area of the posterior third of the handle 40 of the tail zone 50 towards the neck joinder portion 30; this is carried out by employing, either jointly or individually in a holding grip, the thumb finger 10, which presses against the zone approximately defined by 51 with the ovoidal fleshy protuberance 6, by means of the three muscles that compose it and which, by moving the articulation of the metacarpal bone with the carpal, moves against the little finger 14 and executes the gripping action. The little finger, in order to grasp the handle, can move along the area from 56 to 52 and towards the thumb finger 10, while slightly bending the second phalange 14*a*, and more markedly bending the third phalange 14*b*, up to the second interphalangic articulation 13*a* of the ring finger 13.

Figure 3:
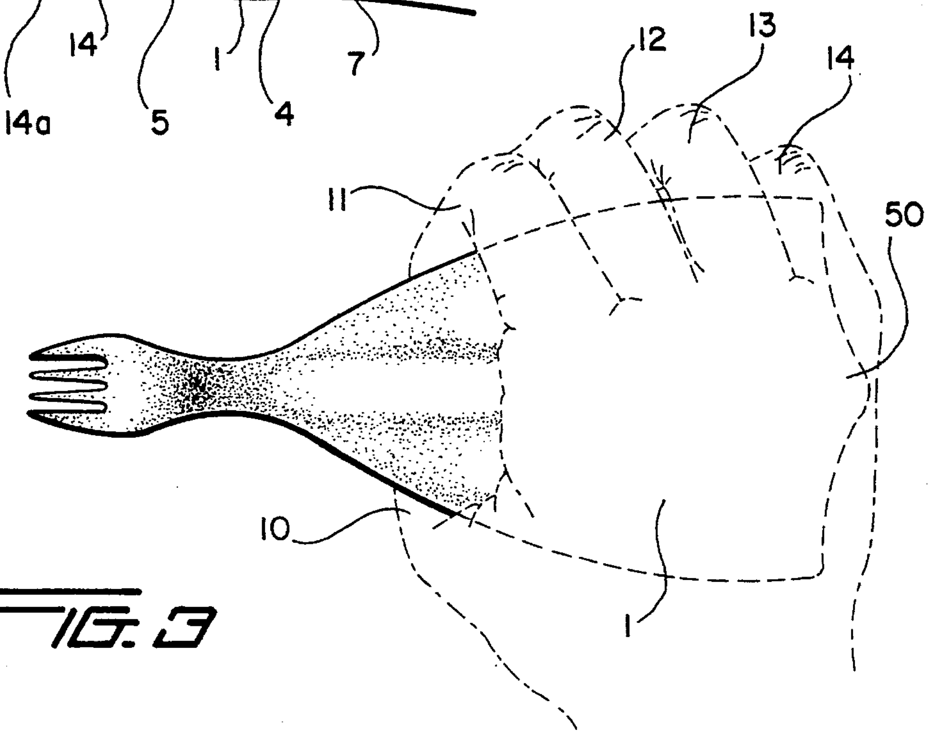
FIG. 3, is a top plan view held of the utensil in another manner.

As shown in FIG. 3, a different type of gripping, for example in cases in which the subject has limited capabilities of fine prehension and of coordination of the palm with the thumb, takes place by executing a hooking grip with fingers 11, 12, 13, 14, which grip the utensil by areas 51 and 54, balancing it through the tail zone 50 where the thumb and the palm do not have a determining function.

It should be noted that the areas of the handle where the grip may take place are various and extensive; the utensil may be gripped in 51, 54, corresponding with the lateral edges; or in 55, 58 corresponding with the distal sides. The grip can be achieved through a combined action of laterality movements; that is, from the bringing together and separating of the fingers; requiring a minimal possibility of movement of the metacarpal-phalangic articulation, but it is sufficient that the grip start from one of the areas described 51, 54, 55, 58, and may start with either a clasping movement provoked by the thumb, or by a hooking movement of the little finger, or by using initially the folds of the palm which form an M-shaped pattern with the bending of the thumb and fingers, or by using the longitudinal bend, or the oblique bend in combination with the thumb 10 and the index finger 11.

Figure 4:
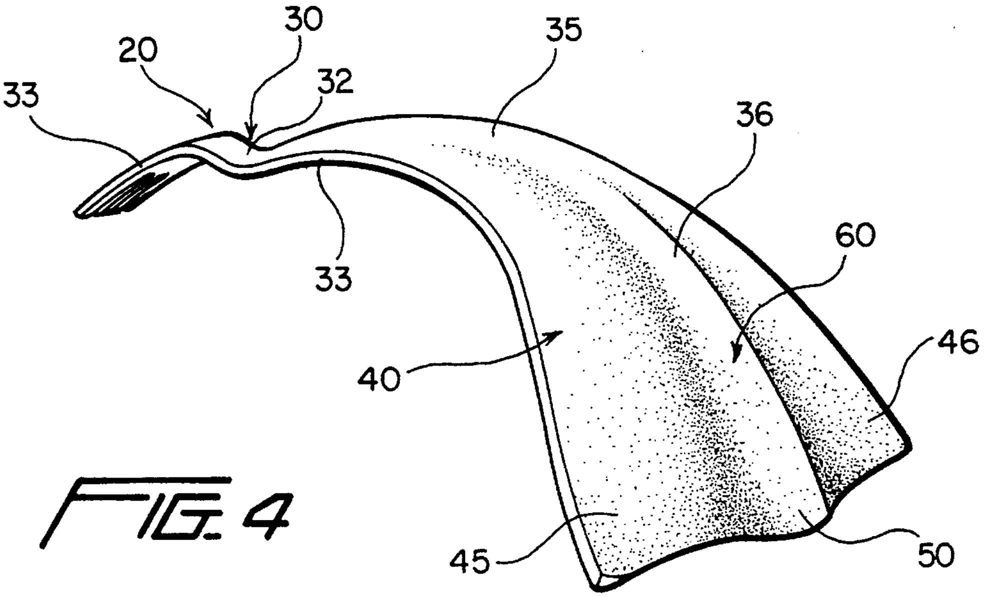
FIG. 4, is a prospective view of the utensil.

Once the grip has been executed, an important part of the handle is represented, as in FIG. 4, by the tail area 50, which placed in the terminal area towards the wrist, represents the extreme part of the raised spine 60, that emerges from point 35 of the flared and tapered handle 40, and which runs longitudinally along the axis 41 while decreasing in height until disappearing into the curve. The spine, at the highest point of the saddle-shaped curve at approximately three quarters of the entire length of the handle, and has a rudder function to add directionality and balance to the utensil, considering that it is to be used by a poorly functioning hand.

The tail area as described 50, is placed into the light depression 8 which is found on the anterior side of the palm 1 of the hand, located between the protruding fleshy portion 6 of the thumb 10 and the protruding elliptical form 7 corresponding to the little finger 14; the articulation of the wrist with the hand, allows the applied forces upon area 50, alone or combined with the forces that the index finger 11 applies upon area 32, to carry out all balancing movements, regardless of the combined action of fingers 10, 12, 13, 14.

Figure 5:
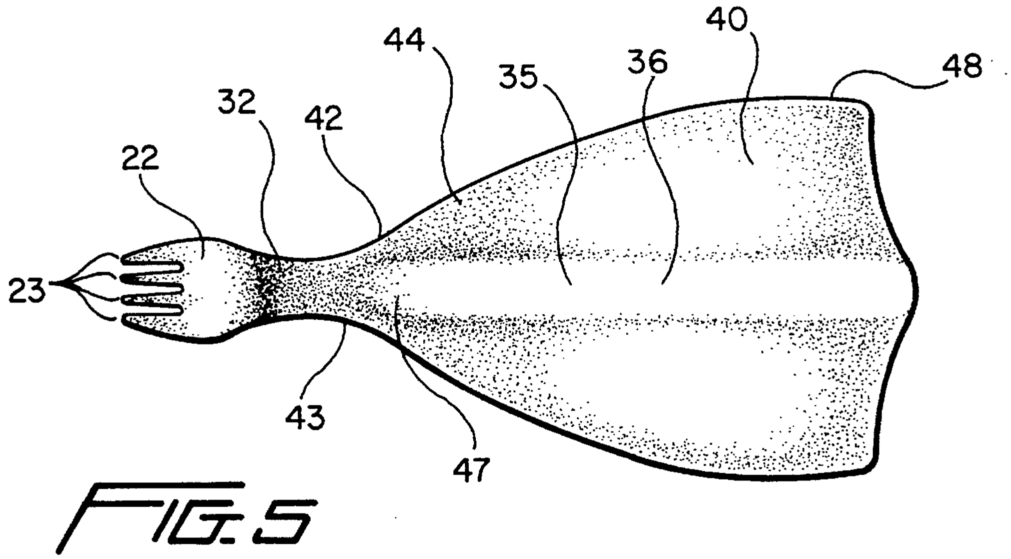
FIG. 5, is a top plan view of the utensil as a fork.
Figure 6:
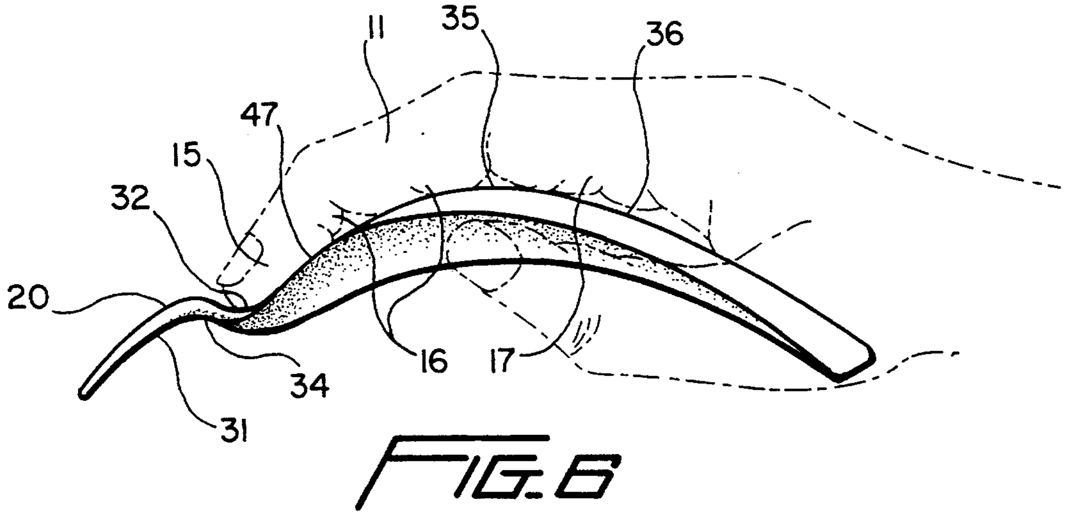
FIG. 6, is a side view of the utensil in FIG. 5 as it is held in FIG. 1.

Therefore, if we consider that the impaired hand has already gripped the utensil, we find that when the utensil is a fork as depicted in FIGS. 1, 5 and 6, it is due to the combined pushing force from 50 into 30 that the tines 23 can engage the food and with a lifting movement whereby 50 is used as a lever and 51, 54, 55, 58, are used for gripping, that the food is brought to the mouth.

Figure 8:
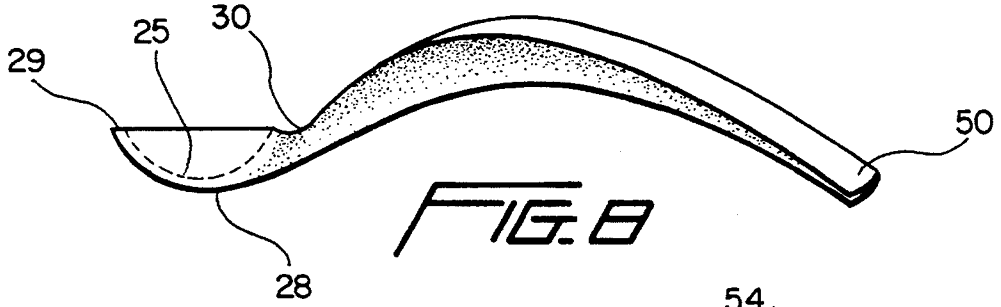
FIG. 8, is a side view of the utensil as shown in FIG. 7.

When the utensil is a spoon as shown in FIGS. 7 and 8 an provided with a bowl-like element 24, concave in location 25 in which 27 describes the perimeter, 29 the forward most point, and 28 the bottom, it is the levering action facilitated by the wrist upon area 50 in combination with a rotation about the central axis 41 that makes it possible to raise the food and bring it to the mouth.

Figure 9:
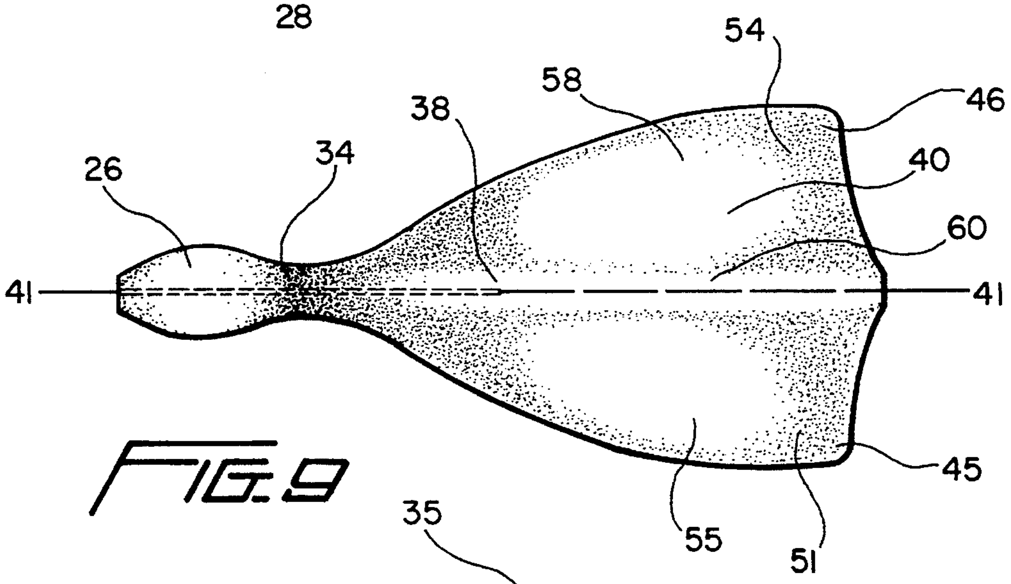
FIG. 9, is a top plan view of the utensil a knife.
Figure 10:
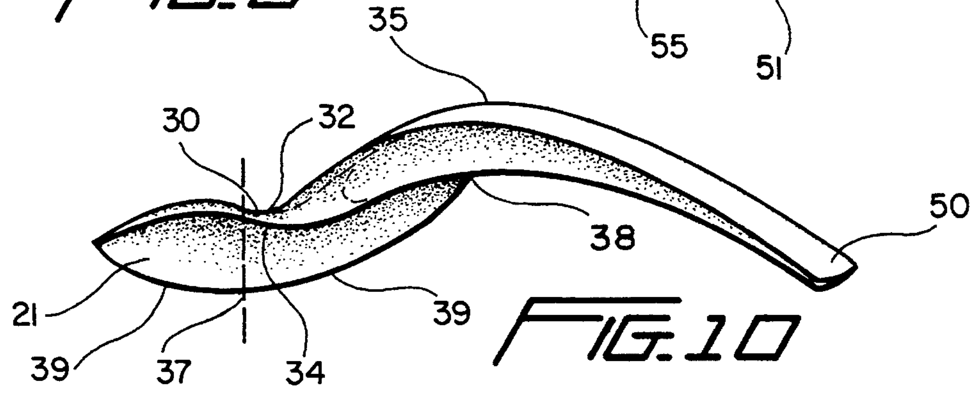
FIG. 10, is a side view of the utensil as shown in FIG. 9.

When the utensil is a knife 26, as shown in FIGS. 9 and 10, it has a blade 21, placed and attached by a fixed or removable means along axis 41, in a location from 34 to 38, approximately, or in other words, form where the neck joinder portion 30 ends and where the handle 40 begins as shown in FIG. 6, from 32 to 35. The blade 21, having a semi-curved reflex S-shape form, said form given by the two circular arcs 32 and 34, provides a flaciform shape 39 which allows the user to easily cut the food, due to the pressure applied by the index finger 11 upon area 15, in cooperation with the entire palm 1, by employing a force which passes through any one of the point 51, 54, 55, 58, guided by the handle in area 50.

The cutting action, one of the most difficult to execute with precision, results for mainly from the multiplicity of points upon which the cutting force may be applied, and for the ease of executing a translatory motion from 50 along the axis 41 with an oscillatory movement with relation to the fulcrum point 37 located approximately at the halfway point of the blade 21.

The foregoing utensil has been described as a fork 22, spoon 24 and knife 26, but it is clear that it is to be understood functionally, as a whole.

The advantages that the present invention offers are to be considered in relation to the limited and sometimes nonexistent capability for articulatory movement and for gripping that afflict the hand of the functionally handicapped individual. The above described device has multiple possibilities; principally, it can be gripped, and this is propaedeutic to all other functions. It then has various possibilities of use, from the most simple, when used as a fork, to one requiring more articulatory ability in the knife configuration. It will be the level of the neuromuscular and articular coordination of the subject that determines the use and all-around function, from the most basic associated with the more severely impaired, to move sophisticated movements of the more able subjects, as well as those expert in the use of the utensil.

An additional advantage is due to the fact that the utensil has both a functional and a dignifying aspect to it, and thus is particularly well accepted by the handicapped, who see it as a special utensil but not one which renders the use of the hand mortifying.

A further advantage derives from the fact that the utensil is produced at low cost, may be widely diffused and accepted by the user for daily use and which doesn't require any special instructions or techniques for its use; thus it may spontaneously enter into use.

I claim:

1. An eating utensil suitable for use by individuals having hand impairments, comprising a head portion, an intermediate neck portion having an upper surface and a lower surface, and an arcuate handle portion extending rearwardly from said neck portion to a rear face, said neck portion and said handle portion together forming a substantially S-shaped configuration for grasping by an individual, said handle portion having an upper surface, a concave lower surface, a longitudinal center line extending along its length, and a pair of symmetric wing portions extending outwardly from said longitudinal center line and varying continuously in width from said neck portion to said rear face, said wing portions each including a concave upper surface region adjacent to said longitudinal center line.

2. The eating utensil of claim 1, which said head portion comprises a plurality of substantially parallel tines.

3. The eating utensil of claim 1, which said head portion comprises a scoop.

4. The eating utensil of claim 1, which said head portion comprises a cutting blade.

5. The eating utensil of claim 4, which said cutting blade is removably secured to said neck portion.

6. The eating utensil of claim 4, which said cutting blade is arcuate shaped.

7. The eating utensil of claim 1, which said neck portion has a substantially S-shaped configuration.

8. The eating utensil of claim 1, further comprising a raised spine which extends along a length of said longitudinal center line.

9. The eating utensil of claim 8, wherein said length is approximately three-quarters of the length of said handle portion.

10. The eating utensil of claim 9, wherein said upper surface of said handle portion has a maximal region and said spine extends rearwardly from said maximal region to said rear face.

11. The eating utensil of claim 10, wherein said spine has a height which varies along its length and which reaches a maximum at said rear face.

12. The eating utensil of claim 11, wherein said handle portion includes a rearwardly extending protrusion approximately at a central position of said rear face.

13. An eating utensil suitable for use by individuals having hand impairments, comprising a head portion, an intermediate neck portion, and an arcuate handle portion extending rearwardly from said neck portion to a rear face, said neck portion and said handle portion forming a substantially S-shaped configuration for grasping by an individual, said handle portion having opposed side edges and a width increasing substantially continuously along a length from said neck portion to said rear face, and said side edges being disposed outwardly relative to said head portion substantially along said length.

14. The eating utensil of claim 13, wherein said side edges of said handle portion define a continuous curvilinear shape along said length.

15. The eating utensil of claim 14, wherein said handle portion includes a concave lower surface, a longitudinal center line, and a pair of symmetric wing portions extending outwardly from said longitudinal center line, said wing portions each including a concave upper surface region adjacent to said longitudinal center line.

16. The eating utensil of claim 15, further comprising a raised spine which extends substantially along said longitudinal center line, said raised spine having a height which varies along its length and reaches a maximum at said rear face, and said handle portion including a rearwardly extending protrusion approximately at a central position of said rear face.

17. An eating utensil suitable for use by individuals having hand impairments, comprising a head portion, an intermediate neck portion, and an arcuate handle portion extending rearwardly from said neck portion to a rear face, said neck portion and said handle portion forming a substantially S-shaped configuration for grasping by an individual, and said handle portion having an upper surface of a width sufficient to contact substantially the palm of a gripping hand of an individual.

18. The eating utensil of claim 17, wherein said handle portion includes opposed side edges which define a continuous curvilinear shape along a length from said neck portion to said rear face and said width increases substantially continuously along said length.

19. The eating utensil of claim 18, wherein said handle portion includes a concave lower surface, a longitudinal center line, and a pair of symmetric wing portions extending outwardly from said longitudinal center line, said wing portions each including a concave upper surface region adjacent to said longitudinal center line.

20. The eating utensil of claim 19, further comprising a raised spine which extends substantially long said longitudinal center line, said raised spine having a height which varies along its length and reaches a maximum at said rear face, and said handle portion including a rearwardly extending protrusion approximately at a central position of said rear face.

* * * * *